US008175097B2

(12) United States Patent
Klemets (10) Patent No.: US 8,175,097 B2
(45) Date of Patent: *May 8, 2012

(54) EMBEDDING A SESSION DESCRIPTION MESSAGE IN A REAL-TIME CONTROL PROTOCOL (RTCP) MESSAGE

(75) Inventor: Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/346,220

(22) Filed: Dec. 30, 2008

(65) Prior Publication Data

US 2009/0106443 A1   Apr. 23, 2009

Related U.S. Application Data

(63) Continuation of application No. 10/836,973, filed on Apr. 30, 2004, now Pat. No. 7,492,769.

(51) Int. Cl.
*H04L 12/28* (2006.01)
*H04L 12/56* (2006.01)
(52) U.S. Cl. .................. 370/392; 370/389; 370/394
(58) Field of Classification Search ............ 370/395.51, 370/389–394; 709/236
See application file for complete search history.

(56) References Cited

U.S. PATENT DOCUMENTS

| 5,634,015 A | 5/1997 | Chang et al. |
| 5,941,951 A | 8/1999 | Day et al. |
| 5,996,015 A | 11/1999 | Day et al. |
| 6,029,200 A | 2/2000 | Beckerman et al. |
| 6,031,818 A * | 2/2000 | Lo et al. ................ 370/216 |
| 6,189,039 B1 | 2/2001 | Harvey et al. |
| 6,195,680 B1 | 2/2001 | Goldszmidt et al. |
| 6,275,471 B1 | 8/2001 | Bushmitch et al. |
| 6,279,029 B1 | 8/2001 | Sampat et al. |
| 6,292,834 B1 | 9/2001 | Ravi et al. |
| 6,317,795 B1 | 11/2001 | Malkin et al. |
| 6,321,252 B1 | 11/2001 | Bhola et al. |

(Continued)

FOREIGN PATENT DOCUMENTS

EP   1280306 A2   1/2003

(Continued)

OTHER PUBLICATIONS

Banchs et al, "Multicasting Multimedia Streams with Active Networks", IEEE, 1998, pp. 11.

(Continued)

*Primary Examiner* — Chuong T Ho
(74) *Attorney, Agent, or Firm* — Lee & Hayes, PLLC (57) ABSTRACT

Embedded within at least some Real-Time Control Protocol (RTCP) messages sent from a media content source to a recipient is a session description message that describes a media presentation being streamed to the recipient. The session description message can be associated, for example, with one of a plurality of pieces of media content in a play list of media content being streamed from the device to the recipient. In accordance with certain aspects, an RTCP message that embeds a session description message includes at least three fields: a first field containing data identifying the RTCP message as being a type that embeds a session description message; a second field containing data that is the session description message for a media presentation; and a third field containing data identifying a length of the RTCP message, generated by summing the length of the first, second, and third fields.

16 Claims, 7 Drawing Sheets

U.S. PATENT DOCUMENTS

| | | | |
|---|---|---|---|
| 6,337,881 B1 | 1/2002 | Chaddha | |
| 6,359,902 B1 | 3/2002 | Putzolu | |
| 6,442,598 B1 | 8/2002 | Wright et al. | |
| 6,564,262 B1 | 5/2003 | Chaddha | |
| 6,608,933 B1 | 8/2003 | Dowell et al. | |
| 6,678,250 B1* | 1/2004 | Grabelsky et al. | 370/241 |
| 6,845,399 B2 | 1/2005 | Agraharam et al. | |
| 6,982,970 B2* | 1/2006 | Takabatake et al. | 370/329 |
| 7,310,334 B1* | 12/2007 | FitzGerald et al. | 370/389 |
| 7,453,815 B1* | 11/2008 | Grabelsky et al. | 370/241 |
| 7,492,769 B2* | 2/2009 | Klemets | 370/392 |
| 2001/0006512 A1* | 7/2001 | Takabatake et al. | 370/329 |
| 2002/0057333 A1 | 5/2002 | Mayuzumi | |
| 2002/0191594 A1* | 12/2002 | Itoh et al. | 370/352 |
| 2002/0196746 A1 | 12/2002 | Allen | |
| 2003/0065917 A1* | 4/2003 | Medvinsky et al. | 713/160 |
| 2003/0221099 A1 | 11/2003 | Medvinsky et al. | |
| 2003/0236912 A1* | 12/2003 | Klemets et al. | 709/236 |
| 2004/0128342 A1 | 7/2004 | Maes et al. | |
| 2005/0281211 A1* | 12/2005 | Takabatake et al. | 370/278 |
| 2005/0281236 A1* | 12/2005 | Takabatake et al. | 370/338 |
| 2006/0206784 A1* | 9/2006 | Park et al. | 714/776 |
| 2007/0110074 A1 | 5/2007 | Bradley et al. | |
| 2007/0124472 A1 | 5/2007 | Requena | |
| 2007/0186002 A1 | 8/2007 | Campbell et al. | |
| 2008/0002709 A1 | 1/2008 | Kennedy et al. | |

FOREIGN PATENT DOCUMENTS

| | | |
|---|---|---|
| EP | 1280306 A3 | 1/2003 |
| EP | 1337061 | 8/2003 |
| FR | 2827451 | 1/2003 |
| JP | 2002141964 A | 5/2002 |
| RU | 2192040 C2 | 10/2002 |
| TW | 512635 | 12/2002 |
| TW | 513892 | 12/2002 |
| WO | WO9501056 | 1/1995 |
| WO | WO02096097 | 11/2002 |
| WO | WO03055219 A2 | 7/2003 |

OTHER PUBLICATIONS

Boavida et al, "Intenet Multimedia-Streaming Media (Tutorial)", IDMS/PROMS, 2002, LNCS 2515, pp. 365.

Clayman et al, "The interworking of Internet and ISDN networks for multimedia conferencing", Information Services & Use, 1995, pp. 15.

Deutsch, "ZLIB Compressed Data Format Specification version 3.3", RFC 1950, May 1996, pp. 11.

Dutta et al, "MarconiNet: Overlay Mobile Content Distribution Network", IEEE Communications Magazine, Feb. 2004, vol. 42, No. 2, pp. 64-75.

Fasanoet al, "Multicast session control center (MSCC)", CSELT Technical Report, vol. 28, No. 3, Jun. 2000, pp. 405-419.

Handley et al, "SDP:Session Description Protocol", RFC 2327, Apr. 1998, pp. 42.

Handley et al, "Session Announcement Protocol", Ref 2974, Oct. 2000, pp. 18.

Haung et al, "Developing multicast, multiple-stream, multimedia presentations using a formal approach", IEEE, 1999, vol. 146, Issue 6, Dec. 1999, pp. 33.

Hertel, "Understanding the Network Neighborhood", retrived at <<http://www.linux-mag.com/cgi-bin/printer.pI?issue=2001-05& article=smb>>, Linux Magazine, 2001, pp. 10.

Huang et al., "Mcast: A Multicast Multimedia Communication Software Development Platform", vol. 1905, Springer-Verlag Berlin Heidelberg, 2000, pp. 53-64.

IP Multicast:"Interactive Multimedia on the Internet", Belnet-Techinical-IP Multicast, <<http://www.belnet.be/technical/pages/multicast/multicast_techinical2.htm/>>, pp. 1-8, 1999.

Pasquale et al., "The Multimedia Multicast Channel", vol. 5, John Wiley & Sons.Ltd, 1994, pp. 13.

Schulzrinne et al, "RTP:A Transport Protocol for Real-Time Application", RFC 3550, Jul. 2003, pp. 104.

Shin et al, "The RTMW application: bringing multicast audio/video to the web", Computer Networks and Isdn System, Apr. 1998, vol. 30, No. 1-7, pp. 685-687.

Tasaka et al, "A performance comparison of single-stream and multi-stream approaches to live media synchronization", IEICE Transactions on Communications, vol. E81-B, No. 11, Nov. 1998, pp. 1988-1997.

Tasaka et al, "Single-stream versus Multi-Stream for Live Media Synchronization", IEEE, 1998, vol. 1, pp. 470-476.

Thomas, "IP Multicast in RealSystem G2", Jan. 15, 1998, Real Network Inc., 1998, pp. 1-14.

Yamamoto, "Multimedia Streaming Technology in Broadband Networks 3- Digital Rights Management System", vol. 69, 2002, pp. 6.

The Korean Office Action mailed Mar. 3, 2011 for Korean Patent Application No. 10-2005-7012410, a counterpart foreign application of U.S. Appl. No. 7,492,769.

Extended European Search Report mailed Nov. 16, 2011 for European patent application No. 11004533.3, 6 pages.

Extended European Search Report mailed Nov. 16, 2011 for European patent application No. 11004532.5, 6 pages.

Taiwanese Office Action mailed Jan. 17, 2012 for Taiwan patent application No. 93122770, a counterpart foreign application of US patent application No. 7,492,769, 17 pages.

* cited by examiner

EMBEDDING A SESSION DESCRIPTION MESSAGE IN A REAL-TIME CONTROL PROTOCOL (RTCP) MESSAGE

RELATED APPLICATION

This application is a continuation of and claims priority to U.S. patent application Ser. No. 10/836,973, filed on Apr. 30, 2004, which is a continuation-in-part of application Ser. No. 10/693,430, filed Oct. 24, 2003, entitled "Methods and Systems for Self-Describing Multicasting of Multimedia Presentations", to Anders E. Klemets, Eduardo P. Oliveira, and James M. Alkove, the disclosure of which is incorporated by reference herein. Any disclaimers that may have occurred during the prosecution of the above-referenced applications are hereby expressly rescinded, and reconsideration of all relevant art is respectfully requested.

TECHNICAL FIELD

This invention relates to streaming media and data transfers, and particularly to embedding a session description message in an RTCP message.

BACKGROUND

Content streaming, such as the streaming of audio, video, and/or text is becoming increasingly popular. The term "streaming" is typically used to indicate that the data representing the content is provided over a network to a client computer on an as-needed basis rather than being pre-delivered in its entirety before playback. Thus, the client computer renders streaming content as it is received from a network server, rather than waiting for an entire "file" to be delivered.

The widespread availability of streaming multimedia content enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

The Session Description Protocol (SDP), Network Working Group Request for Comments (RFC) 2327, is a text-based format used to describe properties of a multimedia presentation, referred to as a "session", and properties of one or more media streams contained within the presentation. SDP has been developed as an application level protocol intended for describing multimedia sessions for the purposes of session announcement, session invitation, and other forms of multimedia session initiation. SDP can be used in accordance with other protocols, such as the Real-Time Streaming Protocol (RTSP) or the HyperText Transfer Protocol (HTTP), to describe and/or negotiate properties of a multimedia session used for delivery of streaming data.

However, in many situations it is difficult to get the SDP information from the network server to the client computer. For example, the network server may be streaming a series of multimedia presentations to the client computer, such as presentations listed in a play list. When the network server switches from streaming one presentation to the next, it is oftentimes difficult for the SDP information for the next presentation to be made available to the client computer. Thus, it would be beneficial to have an additional mechanism by which the SDP information can be made available to the client computer.

SUMMARY

Embedding a session description message in a Real-Time Control Protocol (RTCP) message is discussed herein. Embedded within at least some of the RTCP messages sent from a media content source to a recipient is a session description message that describes the media presentation being streamed to the recipient.

In accordance with certain aspects, an RTCP message that embeds a session description message includes at least three fields. The first field contains data identifying the RTCP message as being a type that embeds a session description message. The second field contains data that is the session description message for a media presentation. The third field contains data identifying a length of the RTCP message, generated by summing the length of the first field, the length of the second field, and the length of the third field.

In accordance with other aspects, the RTCP message is created at a device, such as a server device. The session description message embedded within the RTCP message is associated with one of a plurality of pieces of media content in a play list of media content being streamed from the device to the recipient.

BRIEF DESCRIPTION OF THE DRAWINGS

The same numbers are used throughout the document to reference like components and/or features.

DETAILED DESCRIPTION

Embedding a session description message in a Real-Time Control Protocol (RTCP) message is discussed herein. A multimedia or single media presentation is streamed from a media content source, such as a server device, to a recipient, such as a client device, using Real-Time Transport Protocol (RTP) packets. Control information regarding the presentation being streamed is also sent from the media content source to the recipient using RTCP messages. Embedded within at least some of the RTCP messages is a session description message that describes the presentation being streamed.

In the discussions herein, reference is made to multimedia presentations being streamed from a media content source to a recipient. The media content source can be any source of media content, an example of which is a server device. A recipient can be any recipient of media content, an example of which is a client device. Additionally, it is to be appreciated that although the discussion herein may refer to multimedia presentations being streamed, single media presentations may also be streamed in the same manner as discussed herein regarding multimedia presentations.

Figure 1:
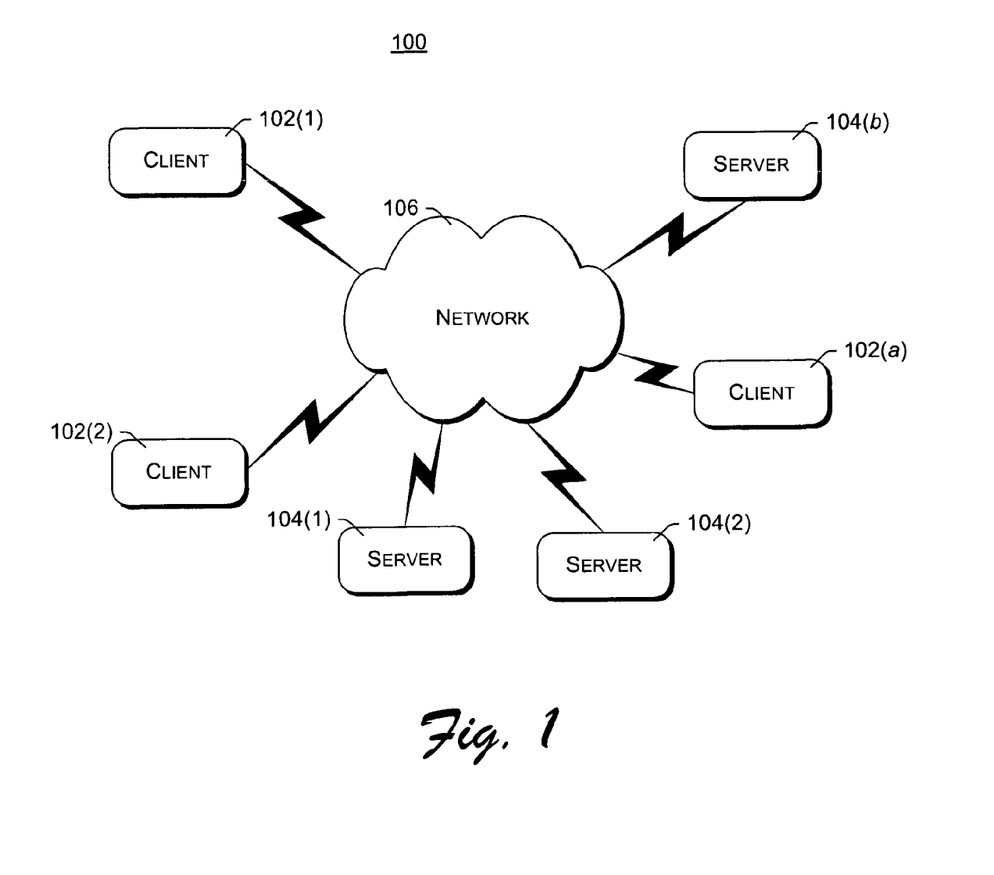
FIG. 1 illustrates an example network environment that can be used to stream media using the session description message embedded in an RTCP message as described herein.

FIG. 1 illustrates an example network environment 100 that can be used to stream media using the session description message embedded in an RTCP message as described herein. In environment 100, multiple (a) client computing devices 102(1), 102(2), . . . , 102(a) are coupled to multiple (b) server computing devices 104(1), 104(2), . . . , 104(h) via a network 106. Network 106 is intended to represent any of a variety of conventional network topologies and types (including wired and/or wireless networks), employing any of a variety of conventional network protocols (including public and/or proprietary protocols). Network 106 may include, for example, the Internet as well as possibly at least portions of one or more local area networks (LANs).

Computing devices 102 and 104 can each be any of a variety of conventional computing devices, including desktop PCs, workstations, mainframe computers, Internet appliances, gaming consoles, handheld PCs, cellular telephones, personal digital assistants (PDAs), etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety (e.g., providing the data on an as-needed basis rather than pre-delivering the data in its entirety before playback). The data may be publicly available or alternatively restricted (e.g., restricted to only certain users, available only if the appropriate fee is paid, etc.). The data may be any of a variety of one or more types of content, such as audio, video, text, animation, etc. Additionally, the data may be pre-recorded or alternatively "live" (e.g., a digital representation of a concert being captured as the concert is performed and made available for streaming shortly after capture).

A client device 102 may receive streaming media from a server 104 that stores the streaming media content as a file, or alternatively from a server 104 that receives the streaming media from some other source. For example, server 104 may receive the streaming media from another server that stores the streaming media content as a file, or may receive the streaming media from some other source (e.g., an encoder that is encoding a "live" event).

As used herein, streaming media refers to streaming one or more media streams from one device to another (e.g., from a server device 104 to a client device 102). The media streams can include any of a variety of types of content, such as one or more of audio, video, text, and so forth.

Figure 2:
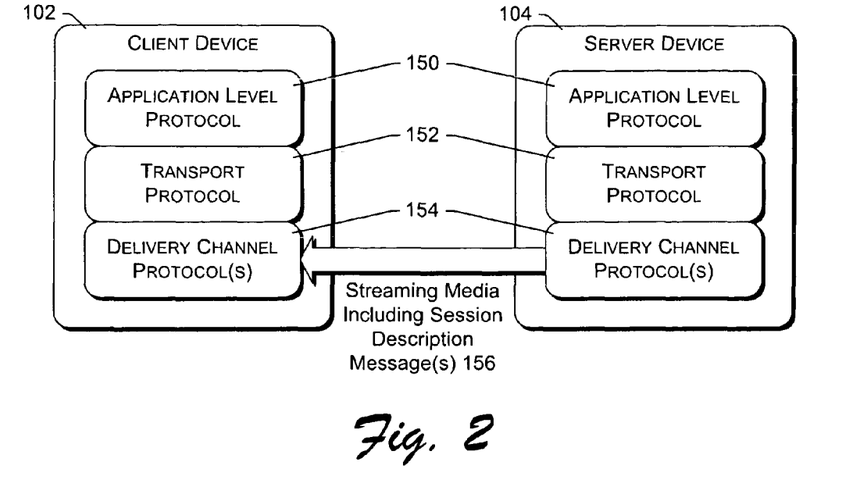
FIG. 2 illustrates example client and server devices that can stream media content using the session description message embedded in an RTCP message as described herein.

FIG. 2 illustrates example client and server devices that can stream media content using the session description message embedded in an RTCP message as described herein. Multiple different protocols are typically followed at both client device 102 and server device 104 in order to stream media content from server device 104 to client device 102. These different protocols can be responsible for different aspects of the streaming process. Although not shown in FIG. 2, one or more additional devices (e.g., firewalls, routers, gateways, bridges, etc.) may be situated between client device 102 and server device 104.

In the example of FIG. 2, an application level protocol 150, a transport protocol 152, and one or more delivery channel protocols 154 are used as part of the streaming process. Additional protocols not shown in FIG. 2 may also be employed (e.g., there may be an additional protocol(s) between application level protocol 150 and transport protocol 152). Application level protocol 150 is a protocol at the application level for control of the delivery of data with real-time properties. Application level protocol 150 provides a framework, optionally extensible, to enable controlled, on-demand delivery of real-time data, such as streaming audio and video content. Application level protocol 150 is a control protocol for initiating and directing delivery of streaming multimedia from media servers. Examples of application level protocol 150 include the Real-Time Streaming Protocol (RTSP) as described in Network Working Group Request for Comments (RFC) 2326, Apr. 1998, and the HyperText Transport Protocol (HTTP) as described in Network Working Group Request for Comments (RFC) 1945, May 1996 or Network Working Group Request for Comments (RFC) 2068, Jan. 1997.

Application level protocol 150 uses transport protocol 152 for the delivery of real-time data, such as streaming audio and video. Transport protocol 152 defines a packet format for media streams. Transport protocol 152 provides end-to-end network transport functions suitable for applications transmitting real-time data, such as audio, video or simulation data, over multicast or unicast network services. Examples of transport protocol 152 include the Real-Time Transport Protocol (RTP) and the Real-Time Control Protocol (RTCP) as described in Network Working Group Request for Comments (RFC) 3550, Jul. 2003. Other versions, such as future draft or standardized versions, of RTP and RTCP may also be used. RTP does not address resource reservation and does not guarantee quality-of-service for real-time services. The data transport is augmented by a control protocol (RTCP) to allow monitoring of the data delivery in a manner scalable to large multicast networks, and to provide some control and identification functionality.

The RTCP protocol groups one or more control messages together into a unit referred to as an RTCP packet. Embedded within one or more of the RTCP packets is a control message that includes a session description message. The session description message describes properties of the multimedia presentation being streamed from server device 104 to client device 102. The streaming media from server device 104 to client device 102 thus includes the session description message.

The transport protocol 152 uses delivery channel protocol(s) 154 for the transport connections. Delivery channel protocol(s) 154 include one or more channels for transporting packets of data from server device 104 to client device 102. Each channel is typically used to send data packets for a single media stream, although in alternate embodiments a single channel may be used to send data packets for multiple media streams. Examples of delivery channel protocols 154 include Transmission Control Protocol (TCP) packets and User Datagram Protocol (UDP) packets. TCP ensures the delivery of data packets, whereas UDP does not ensure the delivery of data packets. Typically, delivery of data packets using TCP is more reliable, but also more time-consuming, than delivery of data packets using UDP.

Figure 3:
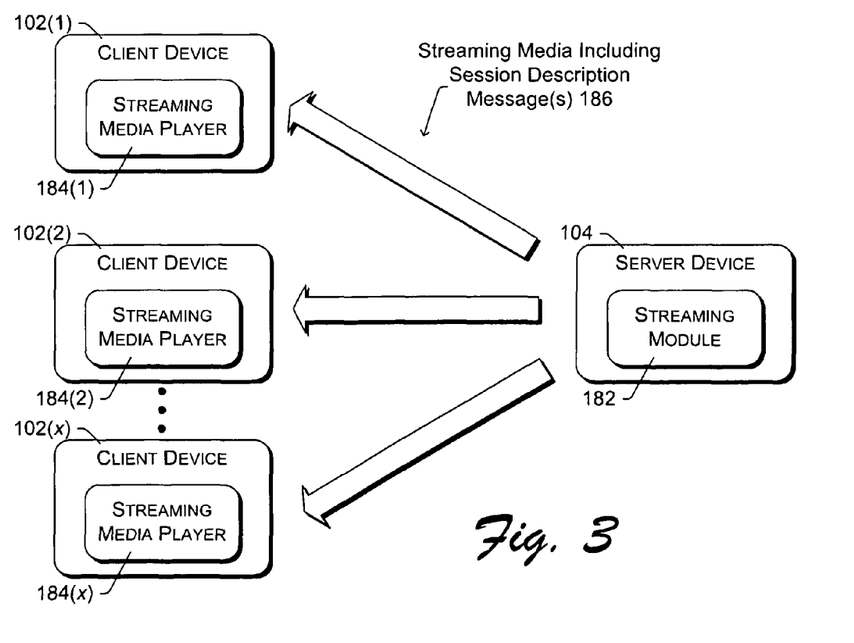
FIG. 3 illustrates example client and server devices in a multicast environment that can stream media content using the session description message embedded in an RTCP message as described herein.

FIG. 3 illustrates example client and server devices in a multicast environment that can stream media content using the session description message embedded in an RTCP message as described herein. In certain embodiments, the protocols 150, 152, and 154 of FIG. 2 are included in the client and server devices of FIG. 3, but have not been illustrated. Furthermore, although not shown in FIG. 3, one or more additional devices (e.g., firewalls, routers, gateways, bridges, etc.) may be situated between client device 102 and server device 104.

A streaming module 182 of server device 104 streams the same multimedia presentation to each of multiple (x) client devices 102(1), 102(2), ..., 102(x). Each client device 102 has a streaming media player 184 that receives the streamed multimedia presentation and processes the received stream at the client device 102, typically playing back the multimedia presentation at the client device 102. The same data is streamed to each client device 102 at approximately the same time, allowing server device 104 to stream only one occurrence of the same multimedia presentation at a time, with the various client devices 102 listening in to this one occurrence being streamed.

The streaming media 186 includes RTCP messages having one or more session description messages embedded therein. The same session description message may be broadcast multiple times during the streaming of the multimedia presentation, thereby allowing new client devices 102 to listen in to the streaming media after streaming has begun but still receive a session description message describing the multimedia presentation. By embedding the session description messages within the RTCP messages of the streaming media 186, client devices 102 do not need to listen in to a separate stream or broadcast, potentially from a device other than server device 182, to receive the session description messages.

Co-pending application Ser. No. 10/693,430, filed Oct. 24, 2003, entitled "Methods and Systems for Self-Describing Multicasting of Multimedia Presentations", which is hereby incorporated by reference, describes an example of such a multicasting environment.

Figure 4:
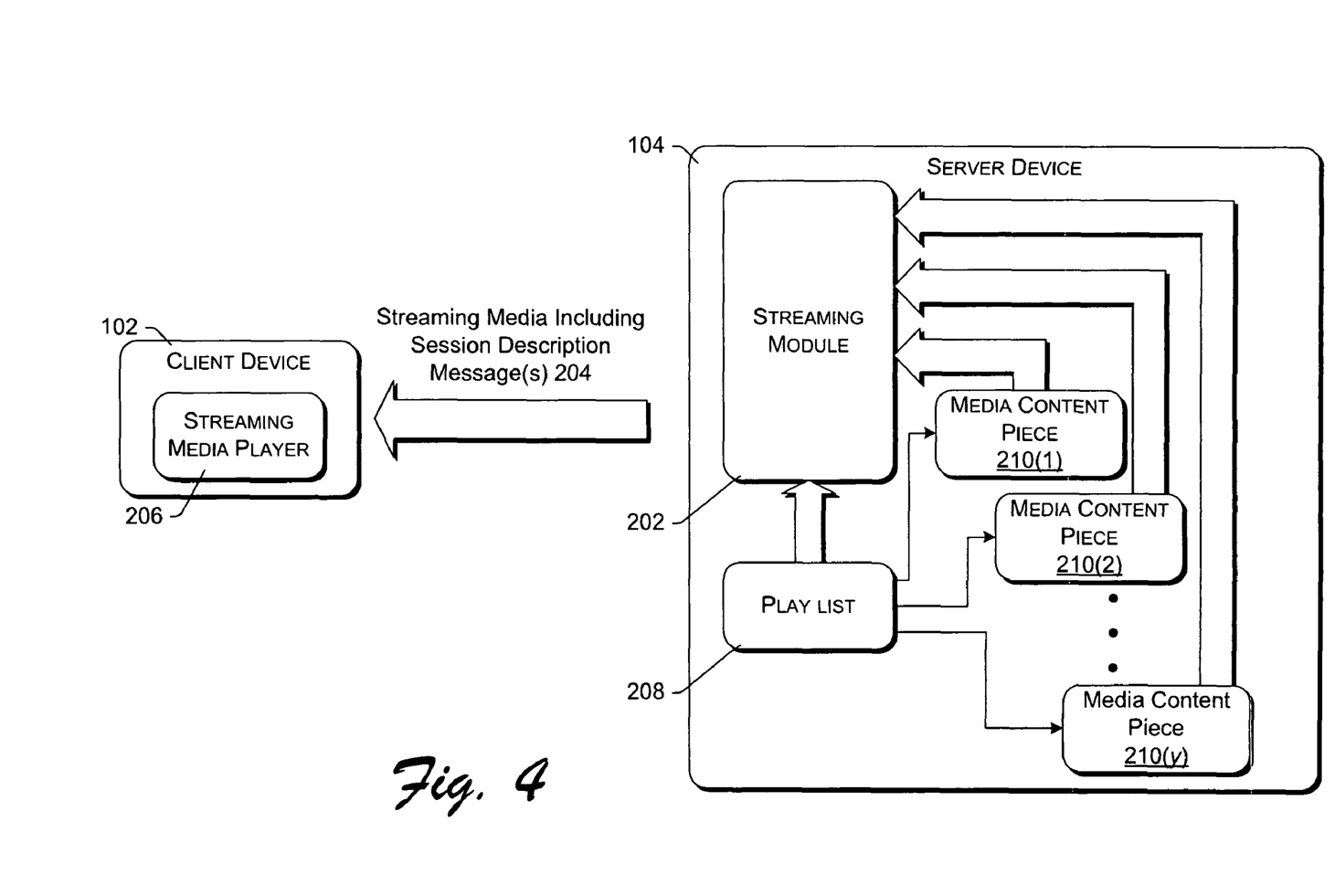
FIG. 4 illustrates example client and server devices in a server-side play list environment that can stream media content using the session description message embedded in an RTCP message as described herein.

FIG. 4 illustrates example client and server devices in a server-side play list environment that can stream media content using the session description message embedded in an RTCP message as described herein. In certain embodiments, the protocols 150, 152, and 154 of FIG. 2 are included in the client and server devices of FIG. 4, but have not been illustrated. Furthermore, although not shown in FIG. 3, one or more additional devices (e.g., firewalls, routers, gateways, bridges, etc.) may be situated between client device 102 and server device 104.

A streaming module 202 of server device 104 streams a multimedia presentation as streaming media 204 to a streaming media player 206 of client device 102. Streaming media player 206 receives the streamed multimedia presentation and processes the received stream at the client device 102, typically playing back the multimedia presentation at the client device 102.

Server device 104 includes a play list 208 that identifies multiple (y) pieces of media content 210(1), 210(2), ..., 210(y). In certain implementations, a play list 208 includes multiple entries, each entry identifying one of the multiple pieces of media content 210. Alternatively, play list 208 may identify a single piece of media content, although in such situations the single piece of media content could simply be referenced by itself rather than through the use of a play list. A client device 102 is able to select a single resource for playback, that resource identifying play list 208. Streaming module 202 accesses the identified play list 208, and then accesses the individual pieces of media content 210 and streams those pieces 210 to client device 102. Thus, the client device 102 is able to access a single resource, yet have multiple different pieces of media content streamed from server device 104. As the play list 208 is accessed by and referred to by server device 104 to identify the pieces of media content, rather than by client device 102, the play list 208 can also be referred to as a server-side play list.

Each piece of media content 210 includes one or more media streams. Different pieces of media content 210 can include different numbers of media streams. Each piece of media content 210 is typically a multimedia presentation. The manner in which a "piece" of content is defined can vary by implementation and based on the type of media. For example, for musical audio and/or video content each song can be a piece of content. Content may be separated into pieces along natural boundaries (e.g., different songs), or alternatively in other arbitrary manners (e.g., every five minutes of content is a piece). For stored content, different pieces of content can be stored as multiple files or alternatively as the same file.

Although illustrated as two separate drawings in FIGS. 3 and 4, it is to be appreciated that pieces of media content referenced by a server-side play list as illustrated in FIG. 4 can be multicast as illustrated in FIG. 3.

Referring to FIGS. 2, 3, and 4, at the transport level the data to be streamed form server device 104 to client device 102 is embedded in RTP packets. Control information related to the data being streamed and the RTP packets is embedded in one or more control messages within an RTCP packet.

Typically, an RTCP packet consists of several messages of different types. The first message in the RTCP packet is either a Receiver Report or a Sender Report. The second message is an SDES (Source Description) message. The SDES message contains one or more textual meta-data items. The SDES message contains a CNAME (canonical name) item. The CNAME item is a persistent transport-level identifier of the media content source and provides a mapping between the RTP synchronization source (SSRC) number and a textual string. The SSRC is a source of a stream of RTP (and RTCP) packets. The CNAME is used so that a sender or receiver that is participating in multiple RTP sessions that belong to the same presentation may use different SSRC values in each RTP session, but keep the CNAME value the same.

An additional type of message that can be included in an RTCP packet is a control message having embedded therein a session description message. The session description message describes properties of the multimedia presentation being streamed from server device 104 to client device 102. Different media formats or protocols can be used for such session description messages. An example of such a media format is the Session Description Protocol (SDP), Network Working Group Request for Comments (RFC) 2327, Apr. 1998. In certain embodiments, the session description message discussed herein is a message in accordance with the SDP format described in RFC 2327.

Although different formats can be used to describe properties of the multimedia presentation, one or more session description messages are sent from server device 104 to client device 102 that include identifier(s) of the properties. A single session description message may be sent by server device 104 for a particular multimedia presentation, or alternatively multiple session description messages may be sent. If multiple session description messages are sent, the multiple messages may include the same information, different information, or overlapping information.

A session description message includes, for example, one or more of: an identification of various channels used to multicast the multimedia presentation; descriptions of each media stream available in the multimedia presentation (e.g., indicating the type of stream (e.g., video or audio), a bit-rate of each media stream, a language used in the stream, etc.); error correction information; security/authentication information; encryption information; or digital rights management (DRM) information; etc.

It should be noted that in certain situations a session description message can be separated or fragmented across multiple RTCP control messages. Such situations can arise, for example, when the session description message is very large. Each of these RTCP control messages is included in a different RTCP packet, and each contains a portion or fragment of the entire session description message. Client device 102, upon receiving all of the portions or fragments, can combine them together to recreate the session description message.

Figure 5:
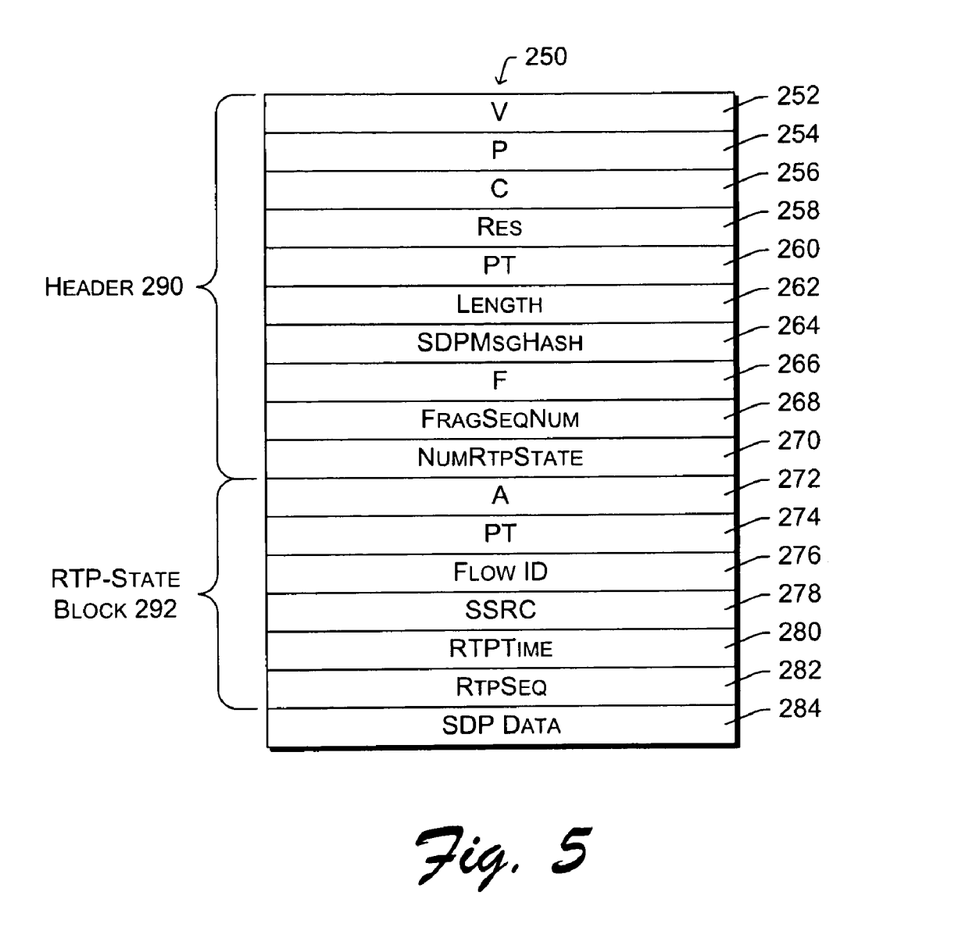
FIG. 5 illustrates an example format of an RTCP message having an embedded session description message.

FIG. 5 illustrates an example format of an RTCP control message 250 having an embedded session description message. RTCP message 250 is discussed below as including multiple fields (also referred to as portions), each storing various data. It is to be appreciated that these fields can be arranged in different orders than the order in which they are discussed below and shown in FIG. 5. Additionally, although sizes or lengths of these fields (e.g., in bits) are discussed below, it is to be appreciated that these are only examples and the fields may alternatively larger or smaller than these example sizes or lengths. In certain embodiments, RTCP message 250 includes all of the fields shown in FIG. 5. In alternate embodiments, RTCP message 250 includes fewer than all of the fields shown in FIG. 5, or may include additional fields not shown in FIG. 5.

The fields of RTCP message 250 can be viewed as being grouped into three groups: a header 290, an RTP-State block 292, and the session description message 284. Header 290 includes various information about RTCP message 250. RTP-State block 292 is optional, and when included is used to identify RTP-specific information about a stream of the multimedia presentation that is described in the session description message (e.g., to specify the SSRC and initial RTP sequence number of a stream in the session description message). Typically, one RTP-State block 292 is associated with and included in RTCP message 250 for each media stream in the multimedia presentation. Session description message 284 is the session description message embedded within RTCP message 250.

V (version) field 252 is a 2-bit field that identifies the version of RTP being used, which is the same in RTCP packets as in RTP packets. For example, the version defined by RFC 3550 is 2.

P (padding) field 254 is a single bit that, when set (e.g., to a value of 1), indicates that RTCP message 250 contains some additional padding at the end which is not part of the control information. This padding is included in the length field 262, but otherwise should be ignored. The amount of padding is included within the padding itself. In certain implementations, the additional padding is in octets, and the last octet of the padding is a count of how many padding octets are included (including itself) and thus should be ignored.

C (compression) field 256 is a single bit that, when set (e.g., has a value of 1), indicates that the data in SDP data field 284 has been compressed. Different types of compression can be used, such as using Zlib compression as discussed in ZLIB Compressed Data Format Specification version 3.3, Network Working Group Request for Comments (RFC) 1950, May 1996.

Res (reserved) field 258 is a 4-bit reserved field. In certain implementations, Res field 258 should be set to zero.

PT (payload type) header field 260 is a 7-bit field set to a value (e.g., 141) to indicate that RTCP message 250 embeds a session description message.

Length field 262 is a 16-bit field that identifies the length of RTCP message 250. This length can be generated by summing the lengths of the various fields in RTCP message 250, including any headers and any padding. In certain implementations, the length is identified in 32-bit quantities minus one.

SDPMsgHash (SDP message hash) field 264 is a 16-bit field used to identify the session description message included in RTCP message 250 and an address (e.g., IP address) of the sender (e.g., server device 104). In certain implementations, the identifier in field 264 is calculated as a check-sum over the session description message and the address, so that if either changes, the value of the identifier in field 264 is also changed. In certain implementations, the value of SDPMsgHash field 264 is calculated in the same manner as the "msg id hash" field described in the Session Announcement Protocol (SAP), Network Working Group Request for Comments (RFC) 2974, Oct. 2000. If the session description message is fragmented across multiple RTCP messages, as discussed below, the value of SDPMsgHash field 264 of each fragment should be identical.

F (more fragments) field 266 is a single bit that, when set (e.g., has a value of 1), indicates that the session description message has been fragmented into multiple RTCP messages, and that the current RTCP message does not contain the last fragment of the session description message. If F field 266 is not set (e.g., has a value of 0), then the session description message has not been fragmented (the complete session description message is included in RTCP message 250), or the session description message has been fragmented and RTCP message 250 contains the last fragment of the session description message.

FragSeqNum (fragment sequence number) field 268 is a 15-bit field used to identify different fragments of a session description message. The fragments of a session description message are assigned identifiers in some manner known to both server device 104 and client device 102. For example, the identifiers may be assigned sequentially starting with the value of 0, so the first fragment has a value 0, the second a value 1, the third a value 2, and so forth. If RTCP message 250 does not contain a fragment of a session description message (i.e., RTCP message 250 contains a complete session description message), then FragSeqNum field 268 should be set to 0.

NumRtpState (number RTP state) field 270 is a 16-bit field used to specify the number of RTP-State blocks contained in RTCP message 250. Each RTP-State block is 14 bytes in size. The "NumRtpState" field is set to 0 when no RTP-State blocks are present. In the illustrated example of RTCP message 250, there is one RTP-State block 292. If there are multiple RTP-State blocks, then a field 272, 274, 276, 278, 280, and 282 is included for each of the multiple RTP-State blocks. If a session description message is fragmented into multiple RTCP messages 250, then only the RTCP message 250 containing the first fragment of the session description message should contain an RTP-State block(s).

A field 272 is a 1-bit field that is not set (e.g., has a value of 0) if PT field 274 contains a valid RTP Payload Type number. If A field 272 is not set, the information in RTP-State block 292 only applies to the RTP Payload Type number identified in PT field 274 and the SDP Flow ID identified in Flow ID field 276. If A field 272 is set (e.g., has a value of 1), then PT field 274 should be ignored, and the RTP-State block 292 applies to all RTP packets for the SDP Flow ID identified in Flow ID field 276, irrespective of the RTP Payload Type used.

PT field 274 is a 7-bit field specifying the RTP Payload Type number for the information in RTP-State block 292. If A field 272 is set (e.g., has a value of 1), then PT field 274 is not used and should be set to 0.

Flow ID field 276 is a 24-bit field that identifies the SDP Flow ID to which the information in RTP-State block 292 refers. Each media stream is streamed over a different RTP session. These RTP sessions are assigned a number using the "a=mid:" attribute as described in the Grouping of Media Lines in the Session Description Protocol (SDP) Network Working Group Request for Comments (RFC) 3388, Dec. 2002. Flow ID field 276 identifies a particular "m=" entry in the session description message, which is the same as the value for the "a=mid" attribute (in accordance with RFC 3388) of the "m=" entry.

SSRC (synchronization source) field 278 is a 32-bit field which specifies the RTP SSRC field value used for the media stream which is identified by Flow ID field 276. If A field 272 is not set (e.g., has a value of 0), then SSRC field 278 only applies to RTP packets for this media stream that use the RTP Payload Type given by PT field 274.

RtpTime (RTP time) field 280 is a 32-bit field that specifies the value of the RTP Timestamp field that an RTP packet would have, if that packet was sent at exactly the beginning of the media stream identified by Flow ID field 276. For example, if the timeline of the media presentation begins at time T, the value of RtpTime field 280 is the value of the RTP Timestamp field of a packet that would be sent at exactly time T, even if no such RTP packet actually exists for the media stream identified by Rtp-State block 292.

RtpSeq (RTP sequence) field 282 is a 16-bit field that gives the value of the RTP sequence number field of the first RTP packet that is sent for the media stream identified by Flow ID field 276. If A field 272 is not set (e.g., has a value of 0), then RtpSeq field 282 only applies to RTP packets for this media stream that use the RTP Payload Type given by PT field 274.

SDP data field 284 is the session description message embedded in RTCP message 250. In situations where the session description message is fragmented, SDP data field 284 contains only a portion of the session description message (e.g., a single fragment of the session description message). In certain implementations, the session description message is a complete SDP description in UTF-8 format.

Figure 6:
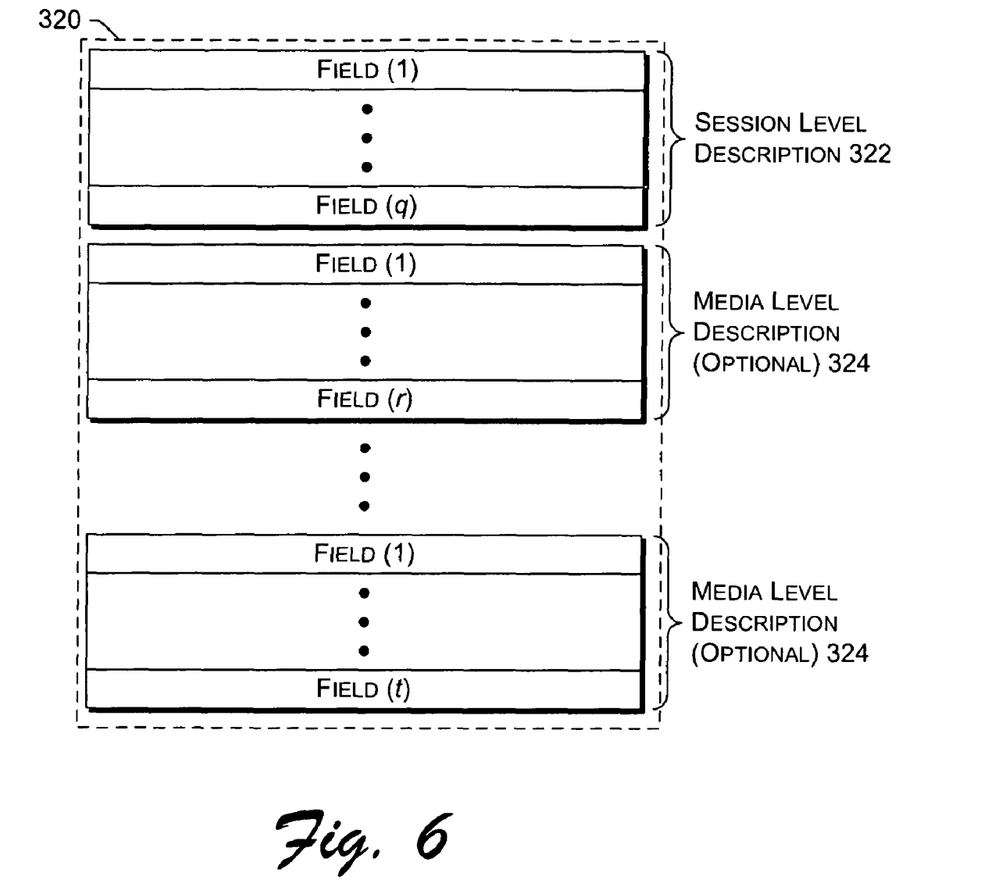
FIG. 6 illustrates an example session description message format.

FIG. 6 illustrates an example session description message format. Although illustrated as a specific example in FIG. 6, the session description message could have a format with fields or portions in different orders, or alternatively spread across different messages.

Session description message 320 includes a session level description portion 322 and zero or more media level description portions 324. Session level description portion 322 includes one or more fields having data that applies to the whole session and all media streams that are part of the session. Each media level description portion 322, on the other hand, includes one or more fields having data that applies only to a single media stream.

The data fields in media level description portion 322 describe properties for particular media streams. These properties may be in addition to properties described in session level description portion 322, or in place of properties described in session level description portion 322. For example, one or more properties in a particular media level description portion 322 may override, for the particular media stream associated with that particular media level description portion 322, properties identified in session level description portion 322.

Session description message 320, and the structure of message 320 is discussed in additional detail below specifically with respect to SDP. It is to be appreciated that these specific structures are only examples, and that the session description message can take different forms.

Session level description portion 322 begins with a particular field, referred to as the protocol version field. Similarly, media level description portions 324 each start with a particular field, referred to as a media name and transport address field. In certain embodiments, multiple fields of the same type may be included in a session description message (e.g., a single session description message may have two or more attribute fields).

Table I below illustrates example fields that may be included in session level description portion 322. Table I includes a name for each example field, an abbreviation or type for each example field, and a brief discussion of each example field. In certain embodiments, the protocol version field, the owner/creator and session identifier field, the session name field, and the time description field are required whereas all other fields in Table I are optional.

TABLE I

| Name | Type | Description |
|---|---|---|
| protocol version | v = | The version of the SDP. |
| origin | o = | The originator of the session (e.g., user name and address of the user's host), plus a session id and a session version number. |
| session name | s = | The name of the session. |
| session information | i = | Information about the session. |
| URI of description | u = | A pointer to additional information about the session. |
| email address | e = | Email address of person responsible for the session. |
| phone number | p = | Phone number of person responsible for the session. |
| connection information | c = | Connection data describing the connection for the session, such as network type, type of addressing being used, and a connection address. |
| bandwidth information | b = | The proposed bandwidth to be used by the session. |
| time description | | See Table II below. |
| time zone adjustments | z = | Specifies adjustment times and offsets to allow for daylight-saving time. |
| encryption key | k = | Indicates the mechanism to be used to obtain an encryption key for the session by external means, or from an included encoded encryption key. |
| attribute | a = | Attribute of the session extending the SDP. |

Table II below illustrates the time description field in additional detail. Table II includes a name for each field in the time description field, an abbreviation or type for each field in the time description field, and a brief discussion of each field in the time description field. The time the session is active field is required whereas the zero or more repeat times field is optional.

TABLE II

| Name | Type | Description |
|---|---|---|
| time the session is active | t = | The start and stop times for the session. |
| zero or more repeat times | r = | Specifies repeat times for the session. |

Table III below illustrates example fields that may be included in a media level description portion 324. Table III includes a name for each example field, an abbreviation or type for each example field, and a brief discussion of each example field. In certain embodiments, the media announcement field is required whereas all other fields in Table III are optional.

TABLE III

| Name | Type | Description |
| --- | --- | --- |
| media announcement | m = | The media type of the media stream, the transport port to which the media stream will be sent, the transport protocol for the media stream, and the media format(s) for the media stream. |
| media title | i = | Information about the media stream (e.g., a label for the media stream). |
| connection information | c = | Connection data describing the connection for the media stream, such as network type, type of addressing being used, and a connection address. |
| bandwidth information | b = | The proposed bandwidth to be used by the media stream. |
| encryption key | k = | Indicates the mechanism to be used to obtain an encryption key for the media stream by external means, or from an included encoded encryption key. |
| attribute | a = | Attribute of the media stream extending the SDP. |

Figure 7:
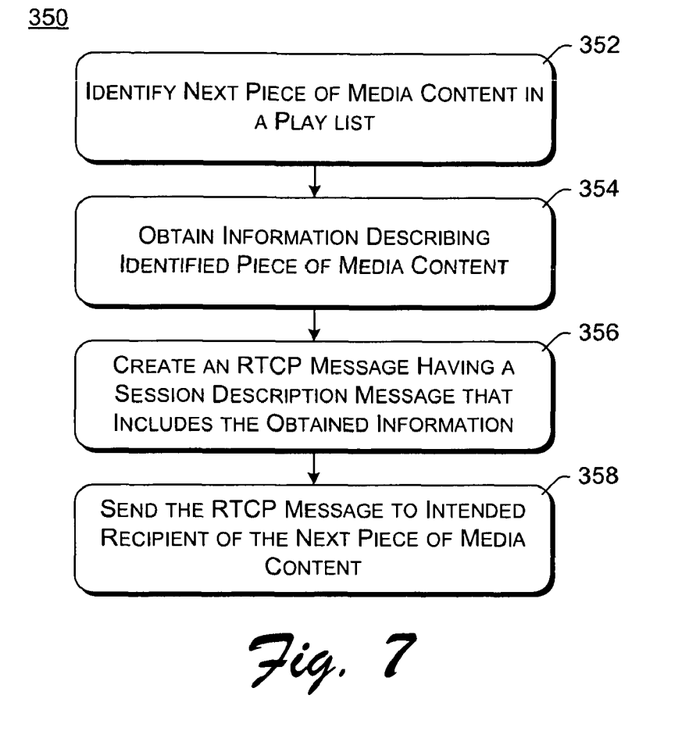
FIG. 7 is a flowchart illustrating an example process for embedding session description messages in an RTCP message when using a play list.

FIG. 7 is a flowchart illustrating an example process 350 for embedding session description messages in an RTCP message when using a server-side play list. FIG. 7 shows acts performed by a media content source, such as a server device 104 (e.g., of FIG. 1, 2, 3, or 4).

Initially, the next piece of media content in the play list is identified (act 352). When playback of the pieces of media content begins, the next piece is the first piece identified in the play list. Additionally, each time the end of one piece of content is reached (e.g., the entire piece of content has been streamed to client device 102, even though play back of the piece at client device 102 has most likely not been completed yet), the next piece of media content is the piece that follows the piece whose end was reached. It should be noted that this next piece may be in the order defined by the play list, or the user may be able to navigate to a different piece within the play list (e.g., the user may be able to request that a particular piece in the play list be skipped or jumped over).

Information describing the identified piece of media content is then obtained (act 354). This information can be obtained in one or more different manners. One manner in which this information can be obtained is retrieval from a file or record. In certain embodiments, at least some of the information is stored in a file or record associated with the identified piece of media content. This file or record is accessed in act 354 to retrieve the information stored therein.

Another manner in which this information can be obtained is receipt from a human user. In certain embodiments, at least some of the information is received from a human user. These user inputs are used in act 354 as at least some of the information to be included in the session description message.

Another manner in which this information can be obtained is automatic detection. In certain embodiments, at least some of the information can be obtained automatically by a computing device by analyzing the source of the identified piece of media content or the identified piece of media content itself. This automatically detected information is used in act 354 as at least some of the information to be included in the session description message.

An RTCP message having a session description message that includes the obtained information is then created (act 356). In certain embodiments, this RTCP message is in the form of RTCP message 250 of FIG. 5 discussed above. The created RTCP message is then sent to the intended recipient of the next piece of media content (act 358). The intended recipient of the next piece of media content is the device to which the media content is being streamed (e.g., client device 102 of FIG. 1, 2, 3, or 4). The created RTCP message is included in an RTCP packet that is included as part of the streaming media being streamed to the intended recipient.

It should be noted that situations can arise where the number of media streams being streamed for two different pieces of media content identified in a play list are different. For example, the first piece of media content identified in a play list may have two streams (e.g., an audio stream and a video stream), while the second piece of media content identified in a play list may have three streams (e.g., an audio stream, a video stream, and a text subtitle stream). Additionally, when streaming media using UDP, each media stream is typically using a different UDP channel that is received at the recipient on a different UDP port. If the recipient only opened two ports for the first piece of media content (e.g., one port for the audio stream and one port for the video stream), there would be no port available for the recipient to receive the text subtitle stream of the second piece of media content.

Such situations can be resolved in different manners. In certain embodiments, such situations are resolved by streaming the additional media stream(s) over an open HTTP connection using TCP. An indication is included in RTCP message 250 (e.g., as an additional RTP-State block 292 for each additional media stream) that the additional media stream(s) is being streamed in this manner.

In other embodiments, such situations are resolved by having the recipient open one or two extra ports, often referred to as wildcard ports. Each of these wildcard ports can be used to receive any media stream that the server device sends to the recipient. An indication is included in RTCP message 250 (e.g., as an additional RTP-State block 292 for each additional media stream) of which of the wildcard ports the additional media stream(s) is being streamed to.

In other embodiments, such situations are resolved by the server device sending the session description message to the recipient (e.g., in an RTCP message 250) that identifies all of the media streams available for the second piece of media content. The server device then waits for the recipient to select which of the media streams the recipient desires to receive. The recipient will make a selection (e.g., automatically or based on user input at the recipient), and send to the server device an indication of which media stream(s) were selected and which ports the selected media stream(s) are to be streamed to.

Figure 8:
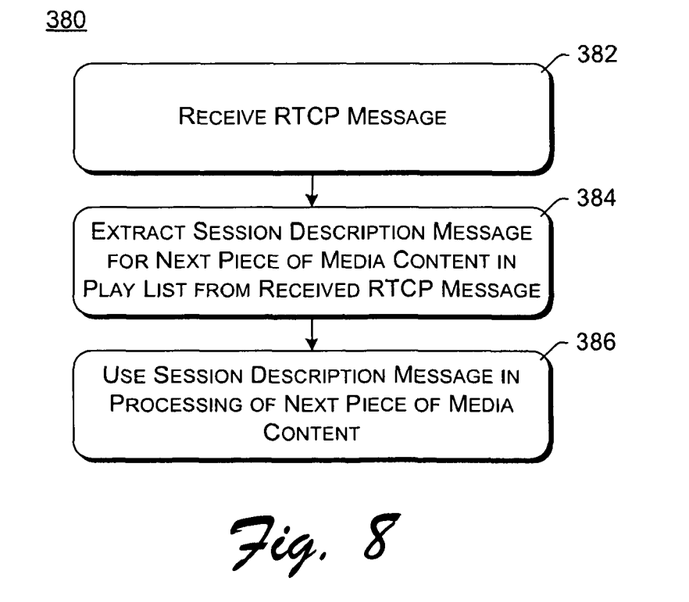
FIG. 8 is a flowchart illustrating an example process for receiving session description messages in an RTCP message when using a play list.

FIG. 8 is a flowchart illustrating an example process 380 for receiving session description messages in an RTCP message when using a server-side play list. FIG. 8 shows acts performed by a recipient of streaming media, such as a client device 102 (e.g., of FIG. 1, 2, 3, or 4).

Initially, an RTCP message is received from a media content source (act 382). The media content source is, for example, a server device 104 of FIG. 1, 2, 3, or 4.

A session description message for a next piece of media content in the play list is extracted from the RTCP message (act 384). When streaming of the pieces of media content in the play list is just beginning, this next piece of media content is the first piece of media content in the play list. After streaming of at least one of the pieces of media content has begun, the next piece of media content is the next piece identified in the play list. It should be noted that this next piece may be in the order defined by the play list, or the user may be able to navigate to a different piece within the play list (e.g., the user may be able to request that a particular piece in the play list be skipped or jumped over). It should also be noted that the session description message for the next piece of media content is typically received prior to playback of the current piece of media content being finished (to allow client device 102 to immediately begin playback of the next piece of media content when playback of the current piece of media content is finished).

The extracted session description message is then used in processing of the next piece of media content (act 386). This processing typically includes playback of the next piece of media content at client device 102.

Figure 9:
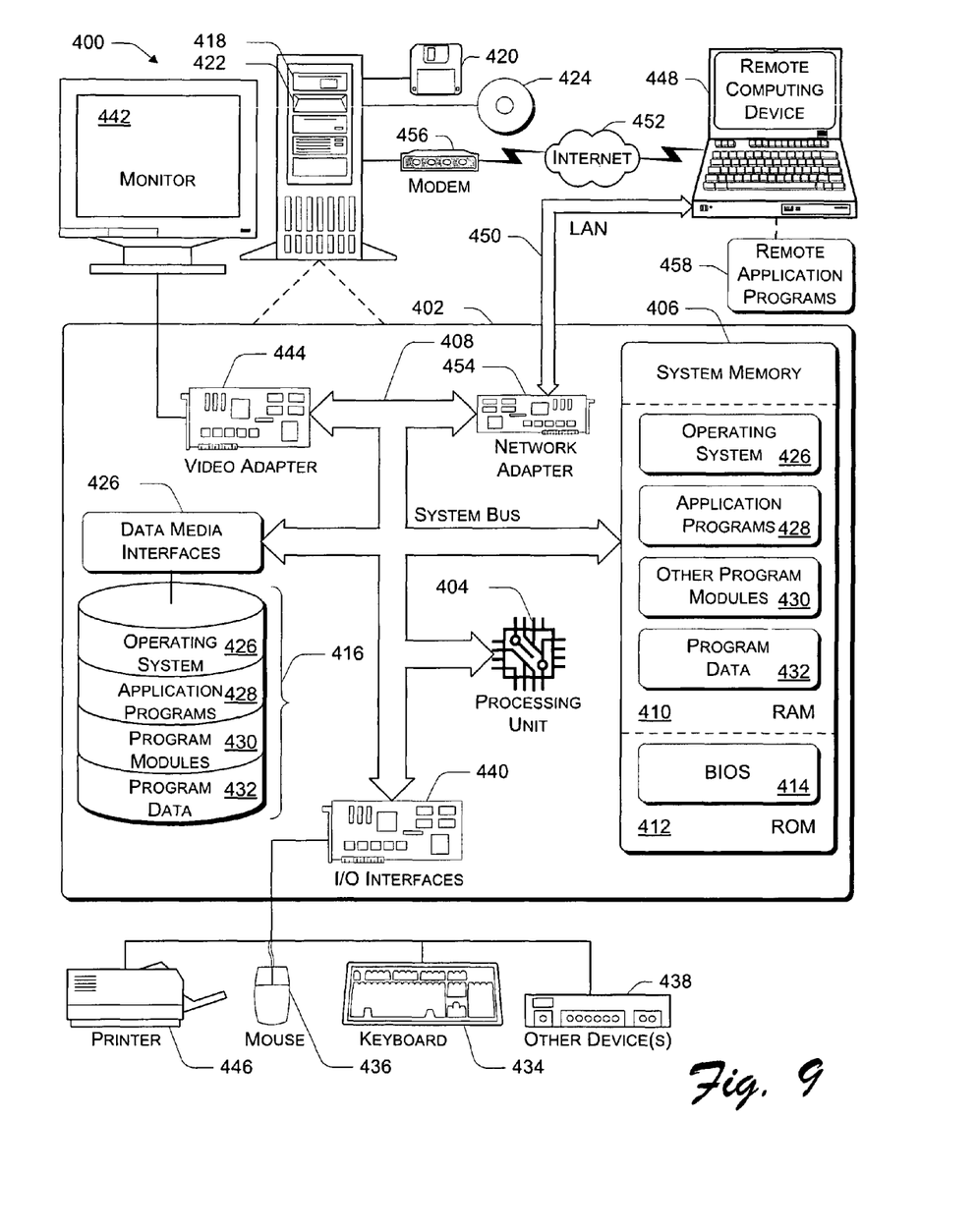
FIG. 9 illustrates a general computer environment, which can be used to implement the techniques described herein.

FIG. 9 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client device 102 or server device 104 of FIG. 1, 2, 3, or 4. Computer 402 can also be an encoder device that is the source of a multimedia presentation. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 9 illustrates a hard disk drive 416 for reading from and writing to a non-removable, non-volatile magnetic media (not shown), a magnetic disk drive 432 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 432, and optical disk drive 422 are each connected to the system bus 408 by one or more data media interfaces 426. Alternatively, the hard disk drive 416, magnetic disk drive 432, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier waves or other transport mechanisms. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method implemented at a device, the method comprising:
   creating a Real-Time Control Protocol (RTCP) message that includes a session description message, the session description message being:
   a Session Description Protocol (SDP) session description message; and
   associated with one of a plurality of pieces of media content in a play list of media content being streamed from the device to a client device; and
   sending the RTCP message to the client device, the RTCP message including:
   one or more Real-time Transport Protocol (RTP) State blocks, each RTP-State block identifying RTP-specific information about a media stream of the one of the plurality of pieces of media content;
   a first field containing data identifying the RTCP message as being a type that embeds the session description message;
   a second field containing data that is the session description message; and
   a third field containing data identifying a length of the RTCP message that is generated by summing a length of the first field, a length of the second field, a length of the third field, and a length of the one or more RTP-State blocks.

2. A method as recited in claim 1, further comprising:
   creating a second RTCP message that includes a second session description message, the second session description message being associated with a second of the plurality of pieces of media content in the play list; and
   sending the second RTCP message to the client device.

3. A method as recited in claim 1, wherein the device comprises a server device.

4. A method as recited in claim 1, wherein the RTCP message is part of an RTCP packet.

5. A method as recited in claim 1, wherein the RTCP message further comprises:
   a fourth field containing one or more of:
   data identifying a version of RTP (Real-Time Transport Protocol) being used to stream the one of the plurality of pieces of media content;
   data identifying whether additional padding is included in the RTCP message;
   data identifying whether the data in the second field has been compressed;
   data identifying the session description message and an address of a sender of the session description message;
   data identifying a number of RTP-State blocks contained in the RTCP message;
   data identifying whether data in an RTP-State block of the RTCP message applies to all RTP packets having a particular SDP Flow ID or only to RTP packets having a particular RTP Payload Type number;
   data identifying an RTP Payload Type number for an RTP-State block of the RTCP message;
   data identifying a media stream of the one of the plurality of pieces of media content which an RTP-State block of the RTCP message refers;
   data identifying a source of a media stream of the one of the plurality of pieces of media content to which an RTP-State block of the RTCP message refers;
   data identifying a value of an RTP Timestamp field that an RTP packet for a media stream of the one of the plurality of pieces of media content would have if the RTP packet was sent at the beginning of the media stream; and
   data identifying a value of an RTP sequence number field of a first RTP packet that is sent for a media stream of the one of the plurality of pieces of media content; and the third field containing data identifying the length of the RTCP message, generated by summing the length of the first field, the length of the second field, the length of the third field, and a length of the fourth field.

6. A method as recited in claim 5, wherein the data identifying the session description message and the address of the sender of the session description message includes a checksum calculated over the session description message and the address of the sender of the session description message.

7. A method as recited in claim 5, wherein the data identifying the number of RTP-State blocks contains a value of zero to indicate that no RTP-State blocks are contained in the RTCP message.

8. A method as recited in claim 1, wherein the RTCP message further comprises:
   a fourth field containing data that indicates that the RTCP message contains a fragment of the session description message;
   a fifth field containing data that identifies the fragment; and
   the third field containing data identifying the length of the RTCP message, generated by summing the length of the first field, the length of the second field, the length of the third field, a length of the fourth field, and a length of the fifth field.

9. A method as recited in claim 1, wherein the RTCP message further comprises:
   a fourth field containing data that identifies a version of RTP (Real-Time Transport Protocol) being used to stream the one of the plurality of pieces of media content;
   a fifth field containing data identifying whether additional padding is included in the RTCP message; and
   the third field containing data identifying the length of the RTCP message, generated by summing the length of the first field, the length of the second field, the length of the third field, a length of the fourth field, and a length of the fifth field.

10. A system comprising:
    one or more processors of the device; and
    a memory for storing computer-executable instructions that, when executed by the one or more processors, execute the method recited in claim 1.

11. A method implemented at a device, the method comprising:
    receiving, from a media content source, a Real-Time Control Protocol (RTCP) message;
    extracting, from the RTCP message, a session description message associated with one of a plurality of pieces of media content in a play list of media content being streamed from the media content source to the device, the session description message being a Session Description Protocol (SDP) session description message, and the RTCP message including:
       a first field containing data identifying the RTCP message as being a type that embeds the SDP session description message;
       a second field containing data that is the SDP session description message; and
       a third field containing data identifying a length of the RTCP message that is generated by summing a length of the first field, a length of the second field, and a length of the third field; and
    processing the one of the plurality of pieces of media content based at least in part on the session description message.

12. A method as recited in claim 11, wherein the RTCP message is part of an RTCP packet.

13. A method as recited in claim 11, further comprising playing back the one of the plurality of pieces of media content at the device.

14. A method as recited in claim 11, further comprising repeating the receiving, extracting, and processing for each of the other pieces of media content in the plurality of pieces of media content.

15. A system comprising:
    one or more processors of a device; and
    a memory of the device for storing computer-executable instructions that, when executed by the one or more processors, execute the method recited in claim 11.

16. A system comprising:
    a server device configured to:
       create a Real-Time Control Protocol (RTCP) message that includes a session description message, the session description message being a Session Description Protocol (SDP) session description message and being associated with one of a plurality of pieces of media content in a play list of media content being streamed from the server device to a client device; and
       send the RTCP message to the client device, the RTCP message including:
          one or more Real-time Transport Protocol (RTP) State blocks, each RTP-State block identifying RTP-specific information about a media stream of one of the plurality of pieces of media content;
          a first field containing data identifying the RTCP message as being a type that embeds the session description message;
          a second field containing data that is the session description message; and
          a third field containing data identifying a length of the RTCP message that is generated by summing a length of the one or more RTP-State blocks, a length of the first field, a length of the second field, and a length of the third field; and
    a client device configured to:
       receive, from the server device, the RTCP message;
       extract, from the RTCP message, the session description message; and
       process the one of the plurality of pieces of media content based at least in part on the session description message.

* * * * *